US006333373B1

(12) United States Patent
Rouse et al.

(10) Patent No.: US 6,333,373 B1
(45) Date of Patent: Dec. 25, 2001

(54) GROUND ELASTOMER AND METHOD

(75) Inventors: Michael W. Rouse, Vicksburg, MS (US); Victor M. Deeb, Marlborough, MA (US)

(73) Assignee: R&D Technology, Inc., Vicksburg, MI (US)

( * ) Notice: Subject to any disclaimer, the term of this patent is extended or adjusted under 35 U.S.C. 154(b) by 0 days.

(21) Appl. No.: 09/247,569

(22) Filed: Feb. 10, 1999

(51) Int. Cl.$^7$ ................................................ C08K 5/15
(52) U.S. Cl. ..................... 524/113; 523/335; 524/210; 524/251
(58) Field of Search ................ 523/338; 524/113, 524/210, 251

(56) References Cited

U.S. PATENT DOCUMENTS

| | | | |
|---|---|---|---|
| 2,833,483 | 5/1958 | China ................................. 241/37 |
| 3,862,078 | 1/1975 | Burke, Jr. ........................... 260/29.6 |
| 3,879,327 | 4/1975 | Burke, Jr. ........................... 260/29.6 |
| 3,892,698 | 7/1975 | Burke, Jr. ........................... 260/29.6 |
| 3,892,700 | 7/1975 | Burke, Jr. ........................... 260/29.6 |
| 3,892,701 | 7/1975 | Burke, Jr. ........................... 260/29.6 |
| 3,892,702 | 7/1975 | Burke, Jr. ........................... 260/29.6 |
| 3,892,703 | 7/1975 | Burke, Jr. ........................... 260/29.6 |
| 3,989,661 | 11/1976 | Bondy ................................ 260/29.7 |
| 4,021,393 | 5/1977 | McDonald .......................... 260/28.5 |
| 4,160,726 | 7/1979 | Delpico .............................. 210/23 |
| 4,340,510 | 7/1982 | Howanietz et al. ................. 260/8 |
| 4,357,270 | 11/1982 | Pippa et al. ........................ 523/335 |
| 4,374,573 | 2/1983 | Rouse et al. ....................... 241/101 |
| 4,383,650 | 5/1983 | Contal et al. ...................... 241/66 |
| 4,427,818 | 1/1984 | Prusinski ............................ 524/442 |
| 4,430,463 | 2/1984 | Mullenax ........................... 524/5 |
| 4,485,201 | 11/1984 | Davis .................................. 524/68 |
| 4,519,550 | 5/1985 | Rouse ................................ 241/167 |
| 4,535,941 | 8/1985 | Brubaker et al. ................... 241/21 |
| 4,560,112 | 12/1985 | Rouse et al. ....................... 241/236 |
| 4,561,467 | 12/1985 | Rouse et al. ....................... 137/624 |
| 4,625,922 | 12/1986 | Brubaker et al. ................... 241/23 |
| 4,680,321 | 7/1987 | Graham ............................. 523/335 |
| 4,714,201 | 12/1987 | Rouse et al. ....................... 241/24 |
| 4,750,437 | 6/1988 | Rouse ................................ 110/346 |
| 4,804,031 | 2/1989 | Rouse et al. ....................... 157/1.21 |
| 4,806,056 | 2/1989 | Rouse et al. ....................... 414/160 |
| 4,841,623 | 6/1989 | Rine .................................. 29/525.1 |
| 4,956,500 | 9/1990 | Vermilion .......................... 525/54.5 |
| 5,205,973 | 4/1993 | Kafka ................................ 264/101 |
| 5,224,990 | 7/1993 | Vicenzi et al. ..................... 106/277 |
| 5,238,194 | 8/1993 | Rouse et al. ....................... 241/21 |
| 5,258,413 | 11/1993 | Isayev et al. ...................... 521/45.5 |
| 5,284,625 | 2/1994 | Isayev et al. ...................... 422/128 |
| 5,290,833 | 3/1994 | Schmanski ........................ 524/71 |
| 5,296,264 | 3/1994 | Blacklidge et al. ................ 427/138 |
| 5,334,641 | 8/1994 | Rouse et al. ....................... 524/71 |
| 5,342,866 | 8/1994 | Trumbore et al. ................. 524/68 |
| 5,397,389 | 3/1995 | Glynn, Jr. .......................... 106/281 |
| 5,397,818 | 3/1995 | Flanigan ............................ 524/68 |
| 5,411,215 | 5/1995 | Rouse ................................ 241/21 |
| 5,436,285 | 7/1995 | Causyn et al. ..................... 524/68 |
| 5,447,388 | 9/1995 | Rouse ................................ 404/72 |
| 5,456,751 | 10/1995 | Zandi et al. ....................... 106/724 |
| 5,460,649 | 10/1995 | Strassman ......................... 106/668 |
| 5,492,561 | 2/1996 | Flanigan ............................ 106/273.1 |
| 5,503,871 | 4/1996 | Blacklidge et al. ................ 427/138 |
| 5,522,559 | 6/1996 | Bredbeck ........................... 241/259 |
| 5,525,653 | 6/1996 | Rouse ................................ 524/71 |
| 5,564,634 | 10/1996 | Rouse et al. ....................... 241/37 |
| 5,583,168 | 12/1996 | Flanigan ............................ 524/68 |
| 5,604,277 * | 2/1997 | Osborn .............................. 524/270 |
| 5,634,599 | 6/1997 | Khais et al. ....................... 241/23 |
| 5,687,881 | 11/1997 | Rouse et al. ....................... 222/185.1 |
| 5,704,971 | 1/1998 | Memon ............................. 106/281.1 |
| 5,711,796 | 1/1998 | Grzybowski et al. ............. 106/281.1 |

OTHER PUBLICATIONS

Herbert Abraham, Asphalts and Allied Substances "Their Occurrence, Modes of Production, Uses in the Arts and Method of Testing", vol. One, pp. 477–495.

D. R. Jones, An Asphalt Primer: Cements Affect Their Permance Understanding How the Origin and Composition of Paving–Grade Asphalt Cements Affect Their Performance, (5/92), pp. 1–10.

Solid Waste Disposal, West Publishing Co., (1995), pp. 416–421.

United States Code Annotated, Cumulative Annual Pocket Part, West Publishing Co., (1996), pp. 422–431.

Code of Federal Regulations, Commerical Practices (1995), pp. 106–115.

West's Wisconsin Statutes Annotated, Cumulative Annual Pocket Part, (1995), pp. 14 and 26–29.

United States Code Annotated, Cumulative Annual Pocket Part, General Index (1996), pp. 40–45.

* cited by examiner

*Primary Examiner*—Edward J. Cain
(74) *Attorney, Agent, or Firm*—Heller Ehrman White McAuliffe LL

(57) ABSTRACT

The present invention relates to a method for converting an elastomer to a decreased size in a grinding apparatus is disclosed. The method includes optionally soaking the elastomer in a first additive. The method further includes reducing the size of the elastomer to form at least one elastomer particle of a first size. The method also includes optionally removing impurities from the elastomer. Further, the method includes adding a carrier to the elastomer particle to form an elastomer slurry. Also, the method includes providing a second additive to the slurry. In addition, the method includes converting the elastomer particle to a second size, the second size being less than the first size. The method also includes recovering the elastomer particle of the second size.

The invention also relates to novel ground elastomers and methods for their use.

7 Claims, No Drawings

GROUND ELASTOMER AND METHOD

CROSS-REFERENCE TO RELATED APPLICATIONS

The following U.S. Patents are cross-referenced and incorporated by reference herein: U.S. Pat. No. 5,238,194 issued Aug. 24, 1993 to Rouse et al. for "METHOD OF PRODUCING FINE ELASTOMERIC PARTICLES"; U.S. Pat. No. 5,411,215 issued May 2, 1995 to Rouse for "TWO STAGE GRINDING". The present application claims priority from the Provisional filing serial No. 60/074,227 filed Feb. 10, 1998 titled "ASPHALT COMPOSITION WITH POLYMERIC MODIFIER", the disclosure of which is incorporated herein by reference including the title, abstract, specification, drawings, claims, and figures.

BACKGROUND OF THE INVENTION

1. Field of the Invention

The present invention relates to the recovery of elastomers. More particularly, the present invention relates to co-grinding an elastomer and an additive in a slurry to produce ground elastomer particles.

2. Description of the Related Art

In recycling and reusing rubber materials, it is generally known to decrease the size of such rubber materials to small ground rubber particles (i.e., particles of irregular outline that pass through a minus 80 mesh or through a minus 50-mesh or finer). Such particles can be chemically more reactive and mechanically easier to dissolve into various mixes.

A variety of rubber products (e.g., natural rubber, synthetic rubber, vulcanized rubber, automotive tire scrap, etc.) may be reduced to ground rubber particles. Known methods for producing rubber of a decreased size include cryogenic cracking of the rubber. Other known methods include the milling of the rubber between horizontal grinding stones in a horizontal grinding mill. Such milling techniques have been developed in the flour, paper pulp industry and the paint pigment compounding industries. Such milling techniques include grinding the rubber between opposed milling wheels, such that one wheel is fixed and the other wheel rotates relative to the fixed wheel. Such known milling techniques include pressing the two wheels against a rubber slurry, such that the rubber is ground to a fine state (i.e., powder) in a single pass. However, such known milling methods have the disadvantage of creating friction and introducing energy to the slurry, which may increase the temperature of the slurry. Increased slurry temperatures may cause "flash over" in which the slurry becomes a largely dry rubber mass that inhibits grinding. Such known milling methods further have the disadvantage of not producing a uniformly fine rubber powder that passes through a minus 50-mesh.

Accordingly, it would be advantageous to have a method for converting an elastomer to a ground particle. It would also be advantageous to have a method to convert an elastomer to a decreased size that decreases soak time of the elastomer. It would also be advantageous to have a method to convert an elastomer to a decreased size that decreases grinding time of the elastomer. It would also be advantageous to have a method that converts an elastomer to a decreased size carried out at a relatively low temperature of an elastomer slurry. It would also be advantages to have an elastomer that chemically combines with an additive to modify the physical properties of the elastomer.

SUMMARY OF THE INVENTION

In accordance with the present invention is provided a method for converting an elastomer to a decreased size in a grinding apparatus. The method includes optionally soaking the elastomer in a first additive. The method further includes reducing the size of the elastomer to form at least one elastomer particle of a first size. The method also includes optionally removing impurities from the elastomer. Further, the method includes adding a carrier to the elastomer particle to form an elastomer slurry. Also, the method includes providing a second additive to the slurry. In addition, the method includes converting the elastomer particle to a second size, the second size being less than the first size. The method also includes recovering the elastomer particle of the second size.

In accordance with the present invention is also provided a ground particle. The ground particle includes an elastomer and an additive. The ground particle is preferably capable of passing through a minus 50-mesh or through a minus 80-mesh.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF THE PREFERRED EMBODIMENTS

The size of an elastomer (e.g., natural rubber, synthetic rubber, recycled rubbers containing polyethylene and/or polypropylene, vulcanized rubber, carbon black, waste from tire production, various polymers, various plastics, thermoplastic elastomers, thermoplastic vulcanates, polyethylene plastics, etc.) may be decreased using a variety of mechanisms. According to an exemplary embodiment, the elastomer is soaked in a fluid. According to a preferred embodiment, the fluid is soapy water and/or an aromatic oil. Soaking the elastomer, among other things, causes the elastomer to swell, removes oils a from the elastomer and dissolves adhesives in the elastomer.

According to an exemplary embodiment, a variety of water-soluble additives may be added to the soaking fluid. The additive, when used during soaking of the elastomer, decreases the swelling time of the elastomer as compared to elastomers soaked in the absence of the additive. According to an alternative embodiment, the additive may be a chemical that swells the rubber, but is not a tackifier, such as tetrahydrofuran (THF) or dimethyl formamide (DMF). According to other alternative embodiments, a variety of additives (as described below) may be used when soaking the elastomer. According to a preferred embodiment the additive used when soaking the elastomer is a fatty amine, such as DELAMIN™ commercially available from Hercules, Inc.

The size of the soaked elastomer may be decreased in a grinding apparatus, such as a set of milling stones. According to an alternative embodiment, the size of the soaked elastomer may be decreased by freezing the elastomer and cracking or hammering the elastomer into small sized particles. According to other alternative embodiments, the soaked elastomer is shredded by a series of blades or an Archimedes screw apparatus. According to still other alternative embodiments, the size of a soaked or non-soaked elastomer may be decreased by brute force (i.e., by two counteracting surfaces). According to a preferred embodiment, grinding of the soaked elastomer material is achieved using the grinding apparatus as disclosed in U.S. Pat. No. 5,238,194 issued Aug. 24, 1993 to Rouse et al. for "METHOD OF PRODUCING FINE ELASTOMERIC PARTICLES" and incorporated herein by reference. The grinding apparatus expediently includes a horizontal grinding machine providing a fixed stator and a rotating rotor, on which disc-shaped grinding stones having hollow centers can be mounted. The grinding stones provide flat, opposing abrasive surfaces (i.e., flat annulus surface), and each grinding stone is opposed to the other. The abrasive surfaces provide periodically spaced openings in the annulus for introducing the elastomers to be ground between the closed, cooperating abrading surfaces.

Impurities (e.g., metals, cords, reinforcing materials, etc.) may be removed from the ground elastomer. According to an alternative embodiment, a magnet may be used to remove certain metallic impurities from the ground elastomer. According to a preferred embodiment, the impurities can be removed by passing the ground elastomer through a screen that allows ¼-inch to ⅝-inch particles to pass through.

An elastomer slurry may be formed by adding a carrier to the ground elastomer. According to an alternative embodiment, the carrier may be a gas (e.g., air) that may carry a wet or dry stream of elastomer particles. According to other alternative embodiments, the carrier is a fluid (e.g., water). According to other alternative embodiments, the carrier may be provided through the grinding apparatus before the slurry is provided through the grinding apparatus. According to any alternative or preferred embodiment, a uniform set point fluid flow rate through a properly spaced set of grinding stones is determined as disclosed in U.S. Pat. No. 5,238,194 issued Aug. 24, 1993 to Rouse et al. for "METHOD OF PRODUCING FINE ELASTOMERIC PARTICLES" and incorporated herein by reference.

According to an exemplary embodiment of the present invention, the additive may be added to the slurry. The additive provides for faster grinding of the slurry as compared to a slurry in which the additive is absent. According to an alternative embodiment the additive is a water miscible dispersing agent for carbon black, such as DAXAD™ commercially available form R. T. Vanderbilt Company, Incorporated of Norwalk, Conn. According to a particularly preferred embodiment about 25% DAXAD™ is added to an elastomer slurry of 15% to 60% solids. According to an alternative embodiment, the additive is a surfactant, such as TRITON-X™ commercially available from Rohm & Haas Company. According to a particularly preferred embodiment, the additive is added to the slurry in the amount of about 1% to 20% based on the amount of elastomer in the slurry, and about 10% to 15% by total weight of the elastomer in the slurry.

The additive provides a higher yield at the first pass of grinding of the slurry as compared to a slurry in which the additive is absent. Use of the additive produces a higher quantity (i.e., more uniformly fine ground and having less shear) particle as compared to a the particles produced from a slurry in which the additive is absent. A slurry having an additive yields a significant increase in throughput of ground particles of the desired smaller size, and a smaller percentage of particles passed through the mill without adequate reduction in size. This alone is beneficial, as the economic losses occasioned by the necessity of screening out insufficiently reduced particles and re-grinding them can be reduced. Further, use of the additive provides decreased grinding times of the slurry as compared to a slurry in which the additive is absent. Decreased grinding times may reduce wear and damage to the wheels of the grinding apparatus.

The additives provide a lower temperature to the slurry as compared to a slurry in which the additive is absent. A slurry in which the additive is absent reaches a temperature of about 400° to 450° Fahrenheit, whereas the slurry having the additive reaches a temperature of about 300° degrees Fahrenheit. Decreased temperature of the slurry is beneficial, in part, because high temperatures may destroy some polymers, less insulation is required in the grinding apparatus, heat damage to the grinding apparatus is decreased and the temperature of the grinding operation is better controlled to achieve the desired viscoelastic effects in milling the elastomer.

The additives chemically react with the elastomer to produce a more desirable elastomer particle. The glass transition temperature (Tg) of the elastomer-additive product is reduced as compared to elastomer particle product in which the additive is absent. A lower Tg value is beneficial in producing downstream materials from the elastomer-additive product because a lower temperature is required for the elastomer-additive product to change from a brittle state to a plastic state, which reduces energy costs. Further, the additives chemically react with the elastomer to produce a more tacky elastomer-additive particle product as compared to the elastomer particle product in which the additive is absent.

According to an alternative embodiment, the additive is a resin (natural or synthetic). According to other alternative embodiments, the additive is a rosin (i.e., a mixture of monocarboxylic acids having a hydrophenanthrene nucleus) such as gum rosin or wood rosin. Rosins are of particular interest because they tend to act as dispersing agents in the elastomer slurry and affect the tackiness of the elastomer-additive product. According to a preferred embodiment of the present invention, the rosin is tall oil rosin (i.e., a by-product of the paper manufacturing process). According to a particularly preferred embodiment, the tall oil rosin has a low acid number, such as XP56™ commercially available from Arizona Chemical Company.

According to an alternative embodiment, the additive is a resin acid (i.e., abietic-type acids that contain an isopropyl group pendent from carbon 13 as numbered using the Chemical Abstracts system, or pimaric-type acids that include a methyl and vinyl group pendent from the same carbon atom). According to other alternative embodiments, the resin acid is abietic acid or rosin soap (i.e., rosin leached with sodium hydroxide). The rosin is made water-soluble by neutralizing the rosin with a suitable base, such as ammonia, ammonium hydroxide, an amine (i.e., a Frisch amine). Other additives of interest include any rosin acid, polymerized rosin acid, esters of rosin acid, dispersions of rosin acid, dispersions of esters of rosin acid, copolymers of rosin acid, disproportionated rosin acid, hydrogenated rosin acid, 9-anthracene carboxylic acid, 2-ethylhexanoic acid, acetal R-type acids, or any organic acid that could be soluble in water by neutralizing the acid.

According to an alternative embodiment, the additive is oleic acid (i.e., $(CH_3(CH_2)_7CH{:}CH(CH_2)_7COOH$ derived from animal tallow or vegetable oils). Oleic acid may not substantially modify the tackiness of the elastomer-additive product.

According to an alternative embodiment, the additive is an oligimer (i.e., a low molecular weight polymer molecule consisting of only a few monomer units (e.g., dimer, trimer, tetramer)). According to a preferred embodiment, the oligimer has a viscosity of about 100,000 CP and tends to act as a dispersing agent in the elastomer slurry. According to a preferred embodiment the oligimer is short chain copolymers of styrene and maleic anhydride that offer typical anhydride functionality in a polymeric material such as SMA™ resin commercially available from Sinclair Petrochemicals, Incorporated. According to a preferred embodiment, the oligimer is ethylene-maleic anhydride copolymers such as EMA™ resin commercially available from Monsanto Industrial Chemicals Co.

According to an alternative embodiment, the additive is an ester, such as di(2-ethylhexyl) adipate (also known as dioctyl adipate or DOA), DOS, DOD or plasticizers in PVC.

A filler may optionally be added to the slurry. The filler may be added to the slurry (i.e., elastomer slurry or elastomer-additive slurry) to combine with the slurry to form an elastomer-additive product or an elastomer product having reinforcing properties, temperature modifying properties, increased high surface area, and/or increased tensile strength. A filler (e.g., nylon) combines with the final elastomer product to give the final product reinforcing properties, temperature modifying properties, increased high surface area, and/or increased tensile strength. According to a particularly preferred embodiment of the present invention, the filler is a nylon material.

The slurry (i.e., elastomer-additive slurry or elastomer slurry) is provided within a grinding apparatus and the elastomer and the additive can be co-ground (or the elastomer is ground) to decrease the elastomer particles to a decreased size. According to an alternative embodiment, the slurry is provided between the two wheels of the grinding apparatus as disclosed in U.S. Pat. No. 5,238,194 issued Aug. 24, 1993 to Rouse et al. for "METHOD OF PRODUCING FINE ELASTOMERIC PARTICLES" and incorporated herein by reference. The grinding stones can be brought into contact with (or spaced a distance apart from) each other. Choosing or maintaining the fixed position of the grinding stones with respect to each other is known in the art of colloid mills. Persons of skill in the art will readily understand how the slurry is input, at a feed pressure, to such grinding stones and how the spacing between the stones is to be adjusted and set. The grinding action generates heat, which may be controlled, modified or reduced by the particular additive in the slurry.

The carrier and the slurry (i.e., elastomer-additive slurry or elastomer slurry) can be separated. According to an alternative embodiment, the liquid from the slurry is removed to a capture region positioned outside the outer perimeter of the opposed grinding stones. According to a preferred embodiment, the carrier is removed by a centrifuge action, such that the carrier is driven off from the slurry and the elastomer-additive particles or the elastomer particles remain.

The grinding of the slurry (i.e., elastomer-additive slurry or elastomer slurry) may be conducted in a single pass or a multiple pass operation. According to an alternative embodiment, the grinding operation may be conducted in a single pass where the coarse particles that do not pass a screening operation can be feed to a slurry (i.e., elastomer-additive slurry or elastomer slurry) for re-grinding. According to any alternative or preferred embodiment, the grinding operation may be conducted in a multiple pass where two interconnected grinding mills sequentially grind the slurry to a final fine grind state as disclosed in U.S. Pat. No. 5,411,215 issued May 2, 1995 to Rouse for "TWO STAGE GRINDING" and incorporated herein by reference. According to the multiple pass grinding operation, a first grinding mill produces an intermediate feedstock of decreased size. The feedstock is re-wet with water or another carrier to form a feed slurry that is then sequentially fed into a second mill. The multiple pass grinding operation, by selecting optimum size of the grinding stones for production of the intermediate feedstock and then for the production of the final minus 80-mesh to 200-mesh product, requires less energy than, for example, the single pass grinding operation.

The elastomer-additive or elastomer product may be dried by heat or air.

According to an alternative embodiment, the carrier "flashes off" when the ground particles in slurry exit from between the grinding stones to a decreased pressure (i.e., atmospheric pressure). The flash avoids the necessity of having a separate processing step of drying the ground particles, which saves energy costs of running a separator. The elastomer product is recovered.

The elastomer, which preferably chemically bonds with the additive to form the elastomer-additive product, has certain functional characteristics. According to an exemplary embodiment, the elastomer-additive product is a very fine powder having a consistency similar to cooking flour. According to an alternative embodiment, the elastomer-additive product is in the original vulcanized state. The top and bottom variation of the softening point of the rosin-modified elastomer-additive product varies by about 1° Celsius. This range of softening variation is advantageous compared to the elastomer product that is not rosin-modified, which has a top and bottom softening point that various by about 10° Celsius.

By using one or more additives with the ground elastomer as described herein, a finely ground product is obtained that is unexpectedly superior in terms of many of its properties, particularly when used in asphalt products such as roofing, paving, building materials, sealants, etc. The final product obtained when using one or more additives as described herein will generally have a bulk density of 26–28 lbs./sq. ft., have a specific gravity of from 1.13 +\−0.02, have 100% of the particles finer than 175 microns or minus 80 mesh. Ground elastomer products prepared as described herein will typically resist phase separation, are storage stable, provide superior low temperature properties and have excellent high temperature stiffness. When the ground elastomer is mixed at a ratio of from 10–15% with asphalt such as WY Sour AC-20, AC-10, Venezu. AC-20, Saudi AC-20 and the like, by any known method, the storage stability of the asphalt product per ASTM D5892 (incorporated herein by reference) also known as the "Cigar Tube" storage stability test will typically range for the top (SP, top, ° F.) from 133–144 and at the bottom (SP, bottom, ° F.) from 134–156. The change in storage stability between the top and bottom sections generally remains substantially unchanged, that is, the $\Delta F.°$ from top to bottom will preferably be from 0–2 degrees. This is beneficial, inter alia, because the small change in storage stability of the asphalt will minimize cracking due to temperature changes since the layers of asphalt applied for example on a road, will generally age at the same rate. Asphalt including a ground elastomer with one or more of the instantly described additives will also be easier to store and ship.

The additive can be added in any desired amount. Preferably the additive is added in an amount from 0.5% to 95%, more preferably from 5% to 40% advantageously from 5% to 20% but in a preferred embodiment is added in an amount of about 10% or 10%, in each case being based on the total weight of the elastomer.

EXAMPLES

10 Samples of ground tire rubber were prepared in accordance with the Two-Stage grinding method to approximately 80 mesh as described in U.S. Pat. No. 5,411,215 and incorporated herein by reference, with the exception that during the first grinding operation, to 9 of the samples, one or more additives were added in the weight percentages indicated in Table 1 below. One sample of natural rubber was ground to approximately 80 mesh. The ground products were then mixed at either a 90:10 or 75:25 ratio with an asphalt and the resultant asphalt was tested. Table 1 sets forth the properties obtained with the various samples.

strain properties (elongation, tensile strength, etc.) were quite good. In fact, the ground tire rubber and additive mixtures had properties more similar to ground natural rubber (examples 4 and 9) as opposed to the ground tire rubber control.

It is important to note that the use of the term "production of elastomer particles" is not meant as a term of limitation, insofar as any product which may incorporate the elastomer product is intended to be within the scope of the term. For example, the elastomeric product may be incorporated into or useful in the production of air blown asphalt, paving asphalt, roofing asphalt (e.g., shingles, roof roofing, undergarments, various membranes, etc.), paving cement

TABLE 1

|  | Control | 1 | 2 | 3 | 4 | 5 | 6 | 7 | 8 | 9 | 10 |
|---|---|---|---|---|---|---|---|---|---|---|---|
| Asphalt % | | | | | | | | | | | |
| Citgo Venezuelan AC-5 | 90 | 90 | 90 | 90 | 90 | 90 | | | | | |
| Diamond Shamrock AC-20 | | | | | | | 75 | 75 | | | |
| Polymer Type % | | | | | | | | | | | |
| Ground Tire Rubber 100% | 10 | | | | | | | | | | |
| Ground Tire Rubber + 10% or Aromatic Oil | | 10 | | | | | 25 | | | | |
| Ground Tire Rubber + 10% KRATON | | | 10 | | | | | 25 | | | |
| Ground Tire Rubber + 10% EVA | | | | 10 | | | | | 25 | | |
| Ground Natural Rubber | | | | | 10 | | | | | 25 | |
| Dupont EVALOY + 10% Ground Tire Rubber | | | | | | 10 | | | | | 25 |
| Softening Point, F. | 142 | 117 | 114 | 122 | 116 | 129 | 129 | 125 | 137 | 132 | 148 |
| Penetration | | | | | | | | | | | |
| Pen at 4 C. | 105 | 50 | 48 | 54 | 56 | 47 | 36 | 38 | 31 | 41 | 30 |
| 25 C. | 113 | 103 | 107 | 107 | | | 83 | 100 | 66 | | |
| Force Ductility, max-force kg at 10 C., kg/cm³, force at 24 cm (1 cm/min) % recovery 800% elongation | 0.23 | 0.14 | 0.14 | 0.12 | 0.29 | 0.341 | 0.34 | 0.42 | 0.73 | 0.96 | 1.22 |
| Storage Stability, 5 days, 205 C. | | | | | | | | | | | |
| Softening Point - top | 174 | 112 | 122 | 111 | 120 | 122 | 127 | 128 | 131 | 121 | 307 |
| Softening Point - bottom | 164 | 115 | 127 | 125 | 119 | 143 | 131 | 141 | 158 | 127 | 152 |
| Difference | 10 | 3 | 5 | 14 | 1 | 21 | 4 | 13 | 27 | 6 | 155 |
| Viscosity, cps | | | | | | | | | | | |
| 175 C. | 687 | 249 | 243 | 162 | | | 2477 | 2047 | 2643 | | |
| 190 C. | 470 | 162 | 158 | 77 | 108 | 244 | 1452 | 1597 | 1568 | 1443 | 7017 |
| 205 C. | 350 | 115 | 111 | 56 | | | 1107 | 1172 | 1040 | | |
| Cold temperature mandrel bend | −35 | −10 | −10 | −10 | −10 | −10 | −10 | −10 | −10 | −15 | −15 |
| Load strain properties at 10 C., in/lbs | 4.13 | 5.52 | 5.3 | 5.7 | 5.4 | 7.9 | 10.8 | 10.6 | 14.2 | 22.01 | 23.3 |
| tensile strength, max.lbs | 0.6 | 0.2 | 0.3 | 0.3 | 0.5 | 0.7 | 0.8 | 0.9 | 1.6 | 1.98 | 2.8 |
| % elongation at break | 23.5 | 69 | 69 | 69 | 69 | 69 | 69 | 69 | 58 | 60 | 52.2 |
| % recovery at break | 784 | 2300 | 2300 | 2300 | 2300 | 2300 | 2300 | 2300 | 1933 | 2000 | 2000 |
| PAV aged 9100 C., 300 psi, 20 hrs) | | | | | | | | | | | |
| PAV Softening Point, F. | 156 | 133 | 140 | 134 | 143 | 167 | 143 | 144 | 148 | 133 | 166 |
| Penetration | | | | | | | | | | | |
| PAV Pen at 4 C. | 108 | 36 | 39 | 32 | 38 | 31 | 28 | 29 | 28 | 33 | 28 |
| Pen ratio, aged/unaged | 1.03 | 0.72 | 0.81 | 1 | 0.68 | 0.65 | 1 | 1 | 0.93 | 0.69 | 0.93 |
| Force Ductility, max-force kg | 0.82 | 0.41 | 0.44 | 0.77 | 0.88 | 1.64 | 14 | 1 | 1.21 | 1.28 | 1.7 |
| kg/cm³, force at 24 cm (1 cm/min) | | 0.22 | 0.31 | 0.47 | 0.12 | 1.17 | 0.35 | 0.45 | 0.5 | 0.25 | 1.29 |
| % recovery 800% elongation | 48 | 64 | 68 | 64 | 42 | 65 | 58 | 63 | 62 | 46.7 | 67.9 |
| Cold temperature mandrel bend, C. | −25 | −5 | −5 | −5 | | −5 | −10 | −10 | −10 | −10 | −10 |
| Load strain properties at 10 C., in/lbs | 4.42 | 19.06 | 27.86 | 24.5 | | | 23.9 | 28.8 | 34.1 | | |
| tensile strength, max lbs. | 1.6 | 1.4 | 1.6 | 2.05 | | | 2.8 | 2.8 | 4.35 | | |
| elongation, cm | 9 | 62.5 | 61 | 52 | | | 42 | 45 | 37.3 | | |
| % at break | 300 | 2084 | 2033 | 1734 | | | 1400 | 1492 | 1242 | | |

As can be seen from Table 1, the ground tire rubber with one or more of the additives described herein has superior properties when mixed in an asphalt as compared with the ground tire rubber alone. In particular, the softening points are much lower, the penetration properties are much lower, their viscosities are generally lower at all temperatures, their mandrel bend at cold temperatures is much higher, their load (i.e., portland cement), the manufacture of any rubber article (e.g., tires, carpet backings, shoe soles, plastic garbage containers, etc.), thermoplastic elastomers, automotive goods (i.e., underbody coatings), insulation, etc.

Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, or use of materials) without materially departing from the novel teachings and advantages of the invention. Accordingly, all such modifications are intended to be included within the scope of the invention as defined in the appended claims. Other substitutions, modifications, changes and omissions may be made in the design, operating conditions and arrangement of the preferred embodiments without departing from the spirit of the invention as expressed in the appended claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The method claimed below will also function on grinding machines which have counter rotating rotor stones, as are commonly used in the pulp and paper grinding industry.

The method claimed below is not restricted to the particular embodiment described above. The method claimed below will function on any grinding machine, including grinding machines having counter-rotating rotors (as are commonly found in the pulp and paper grinding industry).

What is claimed is:

1. A ground particle comprising:

an elastomer, and at least one additive, wherein the particle passes through a minus 50-mesh, and wherein said particle has been prepared by a method comprising:

optionally soaking said elastomer in a first additive;

reducing the size of the elastomer to form at least one elastomer particle of a first size;

optionally removing impurities from the elastomer;

adding a carrier to the elastomer particle to form an elastomer slurry;

providing a second additive which can be the same or different than said first additive, if employed, to the slurry;

converting the elastomer particle to a second size, the second size being less than the first size; and recovering the elastomer particle of the second size.

2. A ground particle comprising:

an elastomer, and a water soluble or water miscible additive, wherein the additive chemically bonds to the elastomer, wherein said additive is capable of swelling said elastomer but is not a tackifier.

3. A particle according to claim 2, wherein said additive is selected from the group consisting of tetrahydrofuran and dimethyl formamide.

4. A ground particle comprising:

an elastomer, and a water soluble or water miscible additive, wherein the additive chemically bonds to the elastomer, wherein said additive is a fatty amine.

5. A ground particle comprising:

an elastomer, and a water soluble or water miscible additive, wherein the additive chemically bonds to the elastomer, wherein the glass transition temperature thereof is lower than the glass transition temperature of said elastomer.

6. A ground particle comprising:

an elastomer, and a water soluble or water miscible additive, wherein the additive chemically bonds to the elastomer, wherein the additive is a natural or synthetic resin.

7. A ground particle comprising:

an elastomer, and a water soluble or water miscible additive, wherein the additive chemically bonds to the elastomer, wherein the additive is present in an amount from 5–20% by weight based on the total weight of the elastomer.

* * * * *